US012519237B2

(12) United States Patent
Renard et al.

(10) Patent No.: US 12,519,237 B2

(45) Date of Patent: Jan. 6, 2026

(54) ELEMENTARY MICROSTRIP ANTENNA AND ANTENNA ARRAY

(71) Applicant: THALES, Courbevoie (FR)

(72) Inventors: Christian Renard, Elancourt (FR); Aurélien Ayissi Manga, Elancourt (FR); Jean-François Fourmont, Elancourt (FR); Joël Herault, Elancourt (FR)

(73) Assignee: THALES, Courbevoie (FR)

( * ) Notice: Subject to any disclaimer, the term of this patent is extended or adjusted under 35 U.S.C. 154(b) by 119 days.

(21) Appl. No.: 18/081,545

(22) Filed: Dec. 14, 2022

(65) Prior Publication Data

US 2023/0198151 A1 Jun. 22, 2023

(30) Foreign Application Priority Data

Dec. 16, 2021 (FR) ...................................... 2113674

(51) Int. Cl.

*H01Q 9/04* (2006.01)
*H01Q 1/38* (2006.01)
*H01Q 1/50* (2006.01)

(52) U.S. Cl.

CPC ............. *H01Q 9/0414* (2013.01); *H01Q 1/38* (2013.01); *H01Q 1/50* (2013.01)

(58) Field of Classification Search

CPC .......... H01Q 9/0414; H01Q 1/38; H01Q 1/50; H01Q 9/0435; H01Q 9/0464

See application file for complete search history.

(56) References Cited

U.S. PATENT DOCUMENTS 4,847,625 A * 7/1989 Dietrich ............... H01Q 9/0457 343/700 MS
4,903,033 A * 2/1990 Tsao ..................... H01Q 15/244 343/700 MS (Continued)

FOREIGN PATENT DOCUMENTS

FR 2685130 A1 * 6/1993 ........... H01Q 9/0435
JP H07212125 A * 8/1995

(Continued)

OTHER PUBLICATIONS

Chiou, et al., "A compact dual-band dual-polarized patch antenna for 900/1800-MHz cellular systems", IEEE Transactions on Antennas and Propagation, vol. 51, Issue: 8, pp. 1936-1940, Aug. 2003.

*Primary Examiner* — Dieu Hien T Duong
(74) *Attorney, Agent, or Firm* — BakerHostetler

(57) ABSTRACT

An elementary microstrip antenna includes a stack of layers, stacked in a direction z, the stack comprising: a first conductive radiating element of disc shape having a first centre, an axis in the direction z and passing through the first centre being called the central axis; a coupling assembly configured to couple an exciting device and the first radiating element, the coupling assembly comprising: a first slot comprising a centre called the slot centre located on the central axis; a second slot comprising a centre coincident with the slot centre, and substantially perpendicular to the first slot, the first and second slots each comprising circularly arcuate ends on the same circle centred on the slot centre; the slots and the stacked layers being configured so that a transverse footprint of the elementary antenna is disc-shaped.

16 Claims, 11 Drawing Sheets

(56) References Cited

U.S. PATENT DOCUMENTS

| | | | | |
|---|---|---|---|---|
| 6,995,712 | B2 | 2/2006 | Boyanov | |
| 7,486,239 | B1 * | 2/2009 | Channabasappa ... | H01Q 9/0414 343/700 MS |
| 10,840,599 | B2 | 11/2020 | Foo | |
| 2011/0025574 | A1 | 2/2011 | Tiezzi et al. | |
| 2014/0145891 | A1 * | 5/2014 | Palevsky .............. | H01Q 9/0435 343/746 |

FOREIGN PATENT DOCUMENTS

| | | | | |
|---|---|---|---|---|
| JP | 2007235592 | A | * | 9/2007 |
| JP | 2009296411 | A | * | 12/2009 |
| WO | 2020/127854 | A1 | | 10/2021 |

* cited by examiner

Prior Art

Prior Art

ELEMENTARY MICROSTRIP ANTENNA AND ANTENNA ARRAY

CROSS-REFERENCE TO RELATED APPLICATION

This application claims priority to foreign French patent application No. FR 2113674, filed on Dec. 16, 2021, the disclosure of which is incorporated by reference in its entirety.

FIELD OF THE INVENTION

The present invention relates to the field of electromagnetic antennas of array type and especially to active antennas. It is especially applicable to radars, to electronic-warfare systems (such as radar detectors and radar jammers) and to communication systems or other multifunction systems.

BACKGROUND

So-called antenna arrays comprise a plurality of elementary antennas that may preferably be microstrip antennas, also referred to as patch antennas. These patch antennas comprise a stack of dielectric-substrate layers provided with metal tracks, spaced apart where appropriate by unetched substrates or materials.

Elementary-microstrip-antenna technology allows very compact antennas, and in particular electronically scanned antenna arrays that are more compact and simpler to produce, and therefore less expensive than other types of antenna (waveguides, Vivaldi antennas, etc.), to be produced.

An elementary microstrip antenna conventionally comprises a radiating element placed on a dielectric layer disposed above a conductive plane serving as ground so as to form a resonator. The elementary antenna also comprises a power-distributing device allowing the radiating element to be excited based on an input signal. The radiating element is coupled to its excitation by a metallized hole (called a via) or by a slot. Slot-based electromagnetic coupling allows a wide frequency band to be generated more easily. It also makes it possible to avoid any linking via between the radiating elements and the excitation, this simplifying manufacture of the elementary antenna.

Conventionally, exciting means able to simultaneously excite the radiating device with two orthogonal linear polarizations are provided. This allows the polarization most suitable for a given environment to be chosen (by combining these 2 polarizations with a suitable phase-amplitude relationship). One example of such an antenna is given in patent FR1873475.

The antennas once arrayed form an array of elementary antennas, the pitch of which is about $\lambda_{Fmax}/2$, where $\lambda_{Fmax}$ is the shortest wavelength corresponding to the maximum frequency Fmax of the band, this being a major constraint on the dimensions of the elementary antennas.

Such an elementary antenna has an overall footprint of square (or rectangular) shape that is entirely suitable for an antenna array of square (or rectangular) lattice, for a double linear h and v polarization. FIG. 1A illustrates an antenna array AR comprising a plurality of elementary antennas AE arranged in a square lattice. It is impossible to obtain +45° and −45° polarizations with the same square-lattice pitch (and therefore with the same beam-pointing capacity), because the footprint of the patch would require the elementary antennas to overlap. FIG. 1B illustrates the overlap that would exist between the elementary antennas AE of an antenna array AR with a square lattice with the same pitch as that of FIG. 1A, for two +45° and −45° polarizations. Likewise, it is impossible to use this elementary antenna in a triangular lattice targeting a similar pointing capacity along the two main axes because of the overlap that would exist between the elementary antennas AE (see FIG. 10).

Furthermore, an elementary antenna typically has a footprint of a half-wavelength in the equivalent dielectric medium considered at the central frequency of use. Reference is then made to operation in TM10 fundamental mode for a given linear polarization.

However, if this bandwidth about the central frequency of use is decreased, a given elementary antenna will naturally become resonant at the frequencies at which its footprint is a multiple of a half-wavelength at the frequencies in question. The impedance of the elementary antenna is once again matched and it will be able to radiate anew. Thus, the antenna will be able to radiate at twice the central frequency of use, i.e. at the so-called 2nd harmonic (H2) or "octave" frequency, or at three-times the central frequency of use, i.e. at the so-called 3rd harmonic (H3). The distribution of the currents and of the fields inside the elementary antenna is different from the distributions of the fundamental mode (TM20 mode for H2 for example), giving a different radiation pattern (for example valleys on-axis and radiation to the sides for H2).

Now, these harmonics, and particularly H2, are generated by the non-linear active circuits of electronically scanned active-antenna-array modules. For reasons regarding frequency allocation, or reasons regarding electromagnetic detectability, or to avoid interference effects, it is necessary to prevent radiation outside of the band of use of the antenna. To do this, it is possible to filter the output of the active modules, but this solution has the drawbacks of ohmic losses, integration and bulk.

SUMMARY OF THE INVENTION

The invention aims to overcome certain problems of the prior art. To this end, one subject of the invention is a versatile microstrip antenna able to be used in any antenna array intended to operate in a given frequency band and the double linear polarization of which is adjustable via orientation of the elementary antennas (for example horizontal and vertical, +45° and −45°, or even left-hand and/or right-hand circular polarization). The elementary antenna of the invention is excited by way of slots in order to couple them to one or more conductive lines, without physical connection. Advantageously, the elementary antenna performs a frequency-filtering function intended to remove parasitic signals that might otherwise pass during transmission or reception, without decreasing radiation efficiency. In addition, the elementary antenna has a geometry compatible with any array format, and therefore in particular compatible with a rectangular lattice or a triangular lattice.

To this end, one subject of the invention is an elementary microstrip antenna (1) comprising a stack of layers, stacked in a direction z, said stack comprising:

- a first conductive radiating element of disc shape having a first centre, an axis in the direction z and passing through said first centre being called the central axis;
- an exciting device coupled to the first radiating element and configured to excite the first radiating element with two orthogonal linear polarizations, said exciting device comprising:

a first elementary exciting device coupled to the first radiating element and comprising a first conductive line and a first power-distributing device that is configured to excite the first radiating element based on a first input signal;

a second elementary exciting device coupled to the first radiating element and comprising a second conductive line and a second power-distributing device that is configured to excite the first radiating element based on a second input signal;

a coupling assembly configured to couple the exciting device and the first radiating element, said coupling assembly comprising:

a first slot comprising a centre called the slot centre located on said central axis;

a second slot comprising a centre coincident with the slot centre, and substantially perpendicular to the first slot, the first and second slots each comprising circularly arcuate ends on the same circle centred on said slot centre;

said slots and said stacked layers being configured so that a transverse footprint of said elementary antenna is disc-shaped.

According to one embodiment, the exciting device comprises:

first (S1) and second stubs that are coplanar and connected to the first conductive line, and not perpendicular to the first conductive line, an angle between the first stub and the first conductive line being opposite to an angle between the second stub and the first conductive line;

third and fourth stubs that are coplanar and connected to the second conductive line, and not perpendicular to the second conductive line, an angle between the third stub and the second conductive line being opposite to an angle between the fourth stub and the second conductive line.

Preferably, in this embodiment, the first and second stubs are parallel to the first slot and the third and fourth stubs are parallel to the second slot. Preferably, an assembly formed by the first and second stubs and a portion of the first conductive line connecting the first stub to the second stub, forms the letter Z, and an assembly formed by the third and fourth stubs and a portion of the second conductive line connecting the third stub to the fourth stub, forms the letter Z. Preferably, the first stub faces an edge of the first slot and the third stub faces an edge of the second slot. Preferably, the stubs are substantially of the same length. Preferably, the length of the stubs is about equal to $\lambda_c/4$ with $\lambda_c$ a wavelength corresponding to a central frequency of a bandwidth of said elementary antenna.

According to one embodiment, a middle of said first line is located on said central axis, a middle of said second line is located on said central axis, and the first and second lines are perpendicular to each other. Preferably, the first line and the second line are formed on two opposite faces of a first dielectric substrate.

According to one embodiment, said transverse footprint is set based on a diameter of said circle.

According to one embodiment, an angle between the first slot and the first conductive line and an angle between the second slot and the second conductive line is equal to about 45°.

According to one embodiment, the first and second conductive lines are interposed between the first radiating element and the first and second slots, the first and second slots being formed from a metal plane, forming a ground plane for the first and second conductive lines and for the first radiating element.

According to one embodiment, the device comprises a second disc-shaped radiating element superposed on the first radiating element, and having a second centre located on said central axis.

Another subject of the invention is an antenna array comprising a plurality of elementary antennas according to the invention.

According to one embodiment, the plurality of elementary antennas is arranged in a square or rectangular lattice.

According to one embodiment, the plurality of elementary antennas is arranged in a triangular lattice.

BRIEF DESCRIPTION OF THE DRAWINGS

Other features, details and advantages of the invention will become apparent on reading the description given with reference to the appended drawings, which are given by way of example and which show, respectively.

In the figures, unless otherwise indicated, elements have not been shown to scale.

In the remainder of the text, by two "parallel elements", what is meant is that an angle between the elements is comprised between 0° and 10°.

DETAILED DESCRIPTION

Figure 1A:
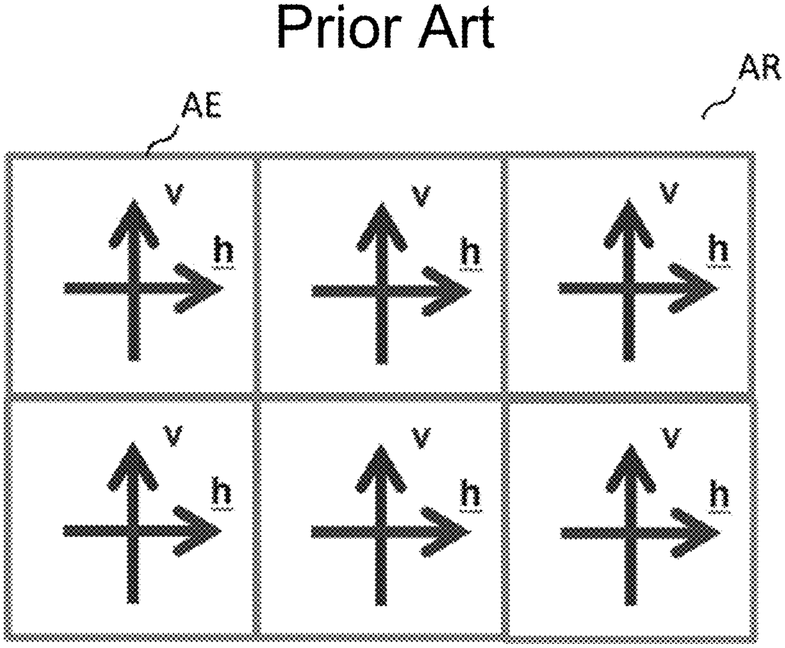
Fig.1A Prior Art
FIG. 1A, a schematic illustration of a known prior-art antenna array comprising a plurality of elementary antennas arranged in a square lattice, FIG. 1B, a schematic illustration of an antenna array with a square lattice with the same pitch as that of FIG. 1A, for two +45° and −45° polarizations, FIG. 1C, a schematic illustration of an antenna array with a triangular lattice with the same pitch as that of FIG. 1A, FIG. 2A, an exploded schematic view of an elementary antenna according to the invention, FIG. 2B, a cross-sectional schematic view of an elementary antenna according to the invention, FIG. 2C, an exploded schematic view of an elementary antenna according to the invention, FIG. 3, a see-through view from above of a stack formed by elements of the elementary antenna of FIG. 2C, FIG. 4, a see-through view from above of a stack formed by elements of one advantageous embodiment of the elementary antenna of the invention, FIG. 5, a graphical representation of the S11 parameter of two embodiments of the elementary antenna of the invention comprising stubs S1-S4 according to the embodiment of FIG. 4, FIG. 6, an antenna array according to one embodiment of the invention, in which the elementary antennas are arranged in a square lattice, FIG. 7, an antenna array according to one embodiment of the invention, FIG. 8, an antenna array according to one embodiment of the invention.
Figure 1B:
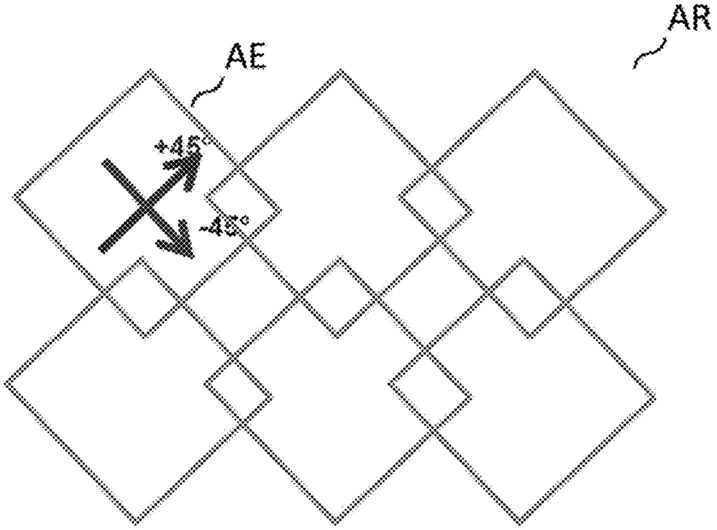
Figure 1C:
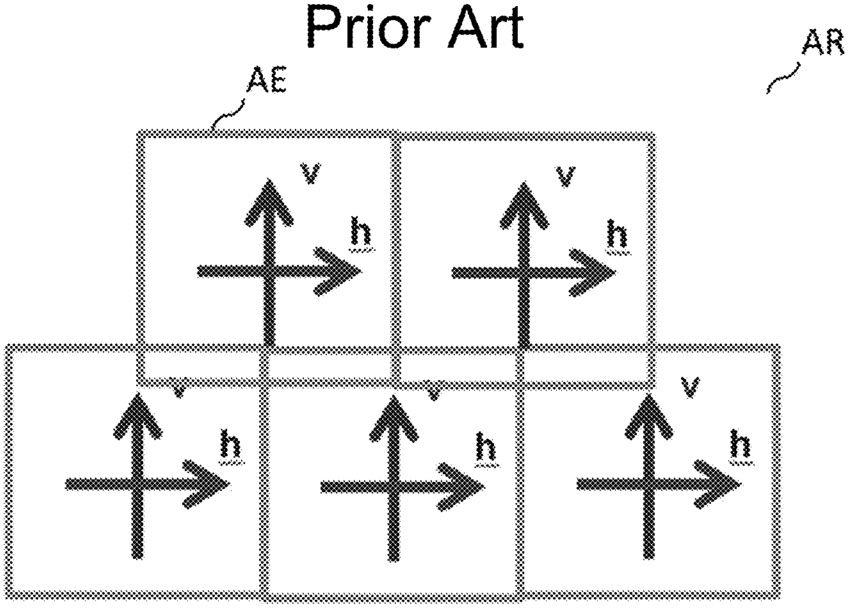
Figure 2A:
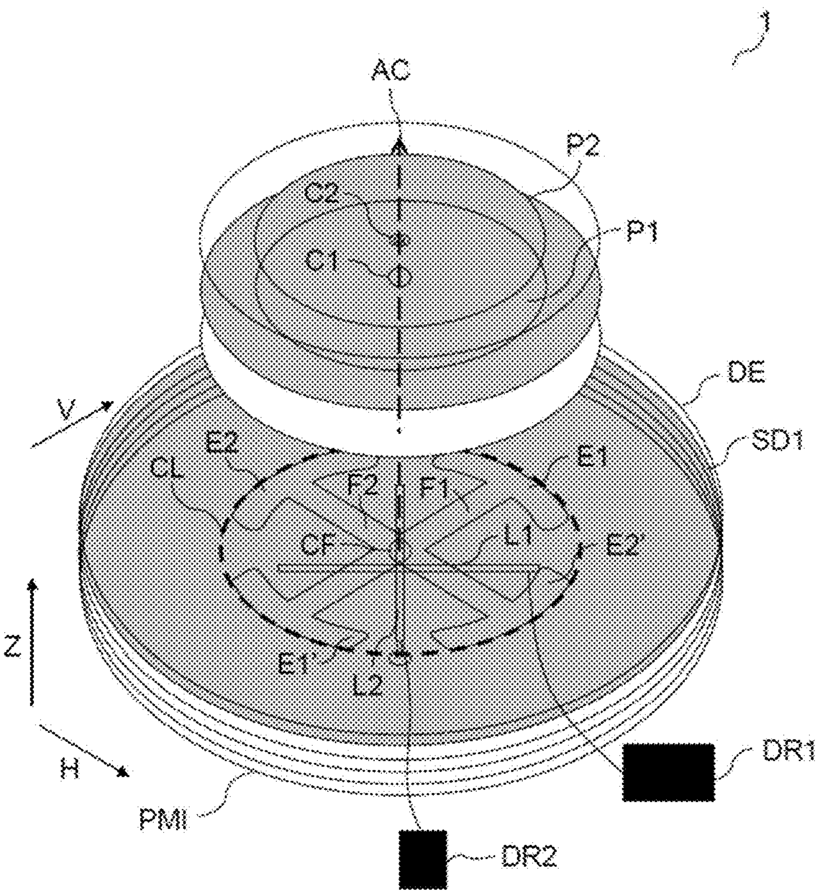

FIG. 2A schematically shows an exploded view of an elementary antenna 1 according to the invention, of the planar type—also referred to as a microstrip antenna.

The elementary antenna is able to be in a planar configuration in which the stack comprises a stack of substantially planar layers perpendicular to a stacking direction represented by the axis z. The elementary antenna may be flexible and able to have a curved configuration in which the layers are curved. In the remainder of the text, for greater simplicity, the arrangement of the antenna will be described in its planar configuration.

Figure 2B:
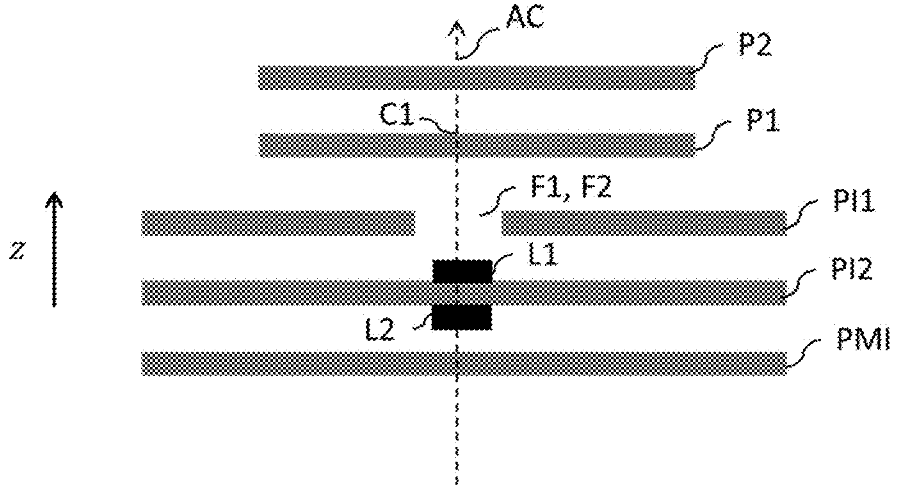

The stack comprises parallel conductive planes, which are spaced apart along the axis z, which is orthogonal thereto. FIG. 2B shows a cross-sectional view of the elementary antenna. For greater legibility, only the conductive planes have been shown in FIGS. 2A and 2B, except those that are explicitly mentioned in the description. Intervals are located between the successive conductive planes. These intervals each comprise at least one layer of a dielectric substrate that may, for example, be a layer of air or of foam.

According to one embodiment, the elementary antenna 1 comprises a first disc-shaped conductive radiating element P1 having a first centre C1. A central axis AC passing through the first centre C1 and in the direction z is defined. Alternatively, according to another embodiment and as illustrated in FIGS. 2A and 2B, the antenna 1 comprises a second disc-shaped radiating element P2 superposed on the first radiating element and having a second centre C2 located on the central axis AC. The presence of two resonant elements allows the bandwidth of the antenna to be increased. The resonant elements are adjusted to form a double resonator.

The elementary antenna 1 comprises an exciting device DE coupled to the first radiating element and configured to excite the first radiating element with two orthogonal linear polarizations h, v. The exciting device DE surmounts a lower ground plane PMI that is the overall ground plane of the antenna 1. By ground plane, what is meant is a conductive plane acting as ground plane.

Figure 3:
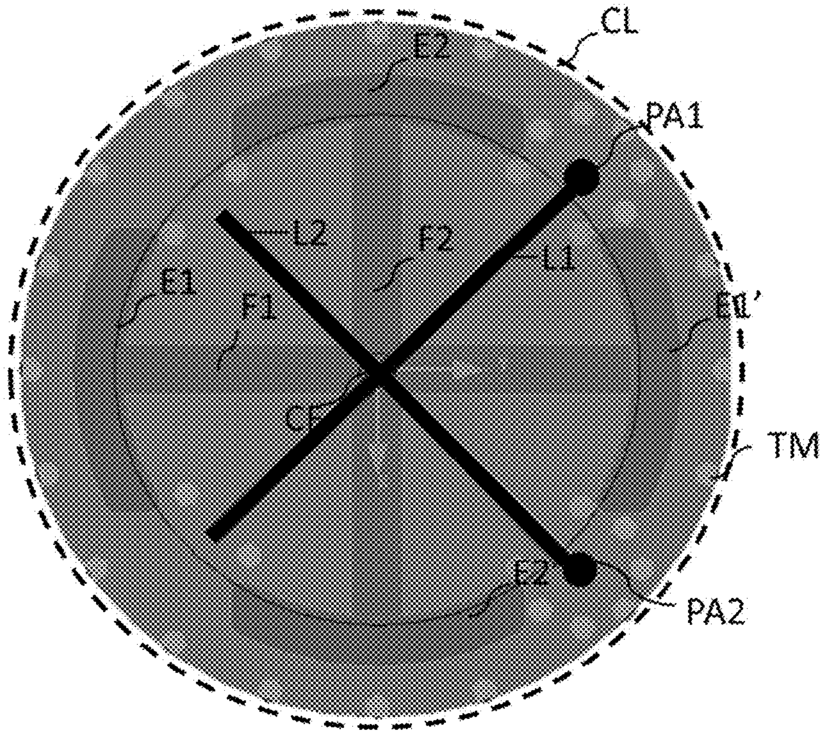

The exciting device DE comprises:

- a first elementary exciting device coupled to the first radiating element and comprising a first conductive line L1 and a first power-distributing device DR1 that is configured to excite the first radiating element based on a first input signal, via a first feed point PA1 of the first line (not shown in FIG. 2A but shown in FIG. 3);
- a second elementary exciting device coupled to the first radiating element and comprising a second conductive line L2 and a second power-distributing device DR2 that is configured to excite the first radiating element based on a second input signal, via a second feed point PA2 of the second line (not shown in FIG. 2A but shown in FIG. 3).

The lines are printed lines in microstrip or stripline technology. A double linear polarization is obtained in a conventional way with two crossed excitations. Conventionally, a left-hand or right-hand circular polarization is produced by phase-quadrature excitation of the feed points PA1, PA2 of the crossed linear polarizations, without modification of the overall footprint. Preferably, the lines are not coplanar to avoid parasitic interactions therebetween. Preferably, as illustrated in FIG. 2B, for greater compactness, the first line and the second line are formed on two opposite faces of the first dielectric substrate P12.

In addition, the elementary antenna of the invention comprises a coupling assembly configured to couple the exciting device and the first radiating element. The coupling assembly comprises:

a first slot F1 comprising a centre called the slot centre CF located on the central axis AC;

a second slot F2 that is substantially perpendicular to the first slot and that comprises a centre coincident with the slot centre. By "substantially perpendicular", what is meant is that an angle between the first and second slot is equal to 90°±10°. The symmetry of the slots ensures, for each linear polarization, the absence of generation of disadvantageous crossed polarization. Using perpendicular slots allows the two linear polarizations to be decoupled.

Preferably, as illustrated in FIGS. 2A and 2B, the slots F1, F2 are coplanar and produced in the same plane P11 in order to limit the number of printed layers in the elementary antenna.

In order to increase the bandwidth of the elementary antenna, the slots F1, F2 each comprise circularly arcuate ends E1, E1', E2, E2' on the same circle CL centred on said slot centre.

In the elementary antenna of the invention, the slots and the stacked layers are configured so that a transverse footprint of the elementary antenna is disc-shaped. This is permitted, inter alia, by the judicious choice of the geometry of the ends of the slots. By "transverse footprint", what is meant here is the footprint on the ground, in a plane perpendicular to the direction z, formed by the layer having the largest transverse dimension. Thus, the elementary antenna with a disc-shaped transverse footprint may be used in an antenna array with a square, rectangular or triangular lattice without modification of the geometry of the elementary antenna and without modification of the pitch of the lattice of the array (see FIGS. 6 and 7). This implies that, via a simple rotation of the elementary antennas, a user may adjust the linear polarization of the radiation, without modifying a beam-pointing capacity of the antenna array. Furthermore, a total transverse footprint of the antenna array is not modified by the rotation of the elementary antennas.

Preferably, the transverse footprint is set based on a diameter of the circle. In other words, in this embodiment, the slots are the elements of the layer of the stack having the largest transverse dimension.

A slot F2 and its ends have a length of the order of one wavelength in the dielectric medium in question.

The elementary antenna comprises a ground plane of the radiating elements P1, P2. Preferably, the first and second conductive lines are interposed between the first radiating element P1 and the first and second slots, and the first and second slots are formed from a metal plane P11, forming the ground plane for the conductive lines L1, L2 and for the first radiating elements P1, P2. By "from", what is meant is that the slots are for example etched or cut into the metal plane. This embodiment allows the compactness of the antenna to be increased and good electromagnetic coupling to be achieved between the conductive lines L1, L2 and the radiating elements P1, P2.

Preferably, according to one embodiment, a middle of the first line and a middle of the second line are located on the central axis, and the first and second lines are perpendicular to each other so as to be correctly decoupled. Preferably, an angle between the first slot and the first conductive line and an angle between the second slot and the second conductive line is equal to about 45°. By "about 45°", what is meant is 45° plus or minus 10°. These features allow, via the slots F1, F2, the first radiating element to be excited at the centre of the first radiating element P1, in order to ensure a good symmetry of excitation over the entire bandwidth of the elementary antenna.

Figure 2C:
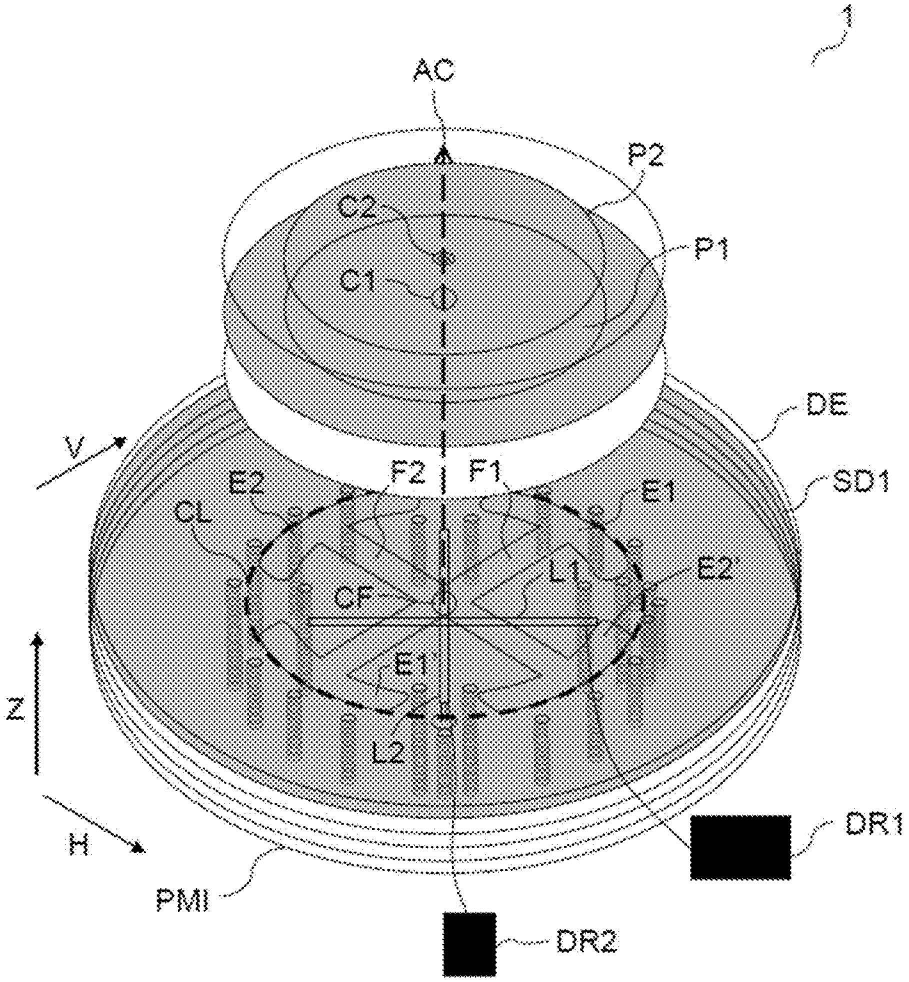

Preferably, as illustrated in FIG. 2C, the elementary antenna comprises a multilayer-PCB stripline circuit CIP for exciting the lines that is common to a plurality of elements of the elementary antenna. In this embodiment, preferably, the transverse footprint of the elementary antenna is defined by shielding provided in the stripline feed PCB, which shielding is typically provided by a succession of metallized holes (or vias) TM short-circuiting the metal plane P11 comprising the cruciform slots and the lower ground plane PMI. In other words, in this embodiment, the transverse dimension is equal to the dimension of the circle CL formed by the metallized vias encircling the rounded edges of the slots and shielding the elementary antenna from the other adjacent elementary antennas when the elementary antenna is arranged in an array.

FIG. 3 schematically illustrates a see-through view from above of a stack formed by elements of the elementary antenna of FIG. 2C, a layer comprising the slots F1, F2, the conductive line L1, and the line L2. The metallized vias TM defining the circle CL and therefore the transverse footprint are also shown in FIG. 3.

According to one embodiment, different from that illustrated in FIG. 2A, each slot is excited at two excitation points on either side of the slot centre CF by two respective printed lines that are joined on another printed layer by a balanced wideband coupler. In this embodiment, the elementary antenna 1 therefore comprises four printed lines. These features allow very wideband operation with high excitational symmetry over the entire frequency band.

Preferably, the first radiating element comprises an optical alignment mark placed at its first centre C1 in order to facilitate centring of the various elements and of the various planes of the stack with one another.

Figure 4:
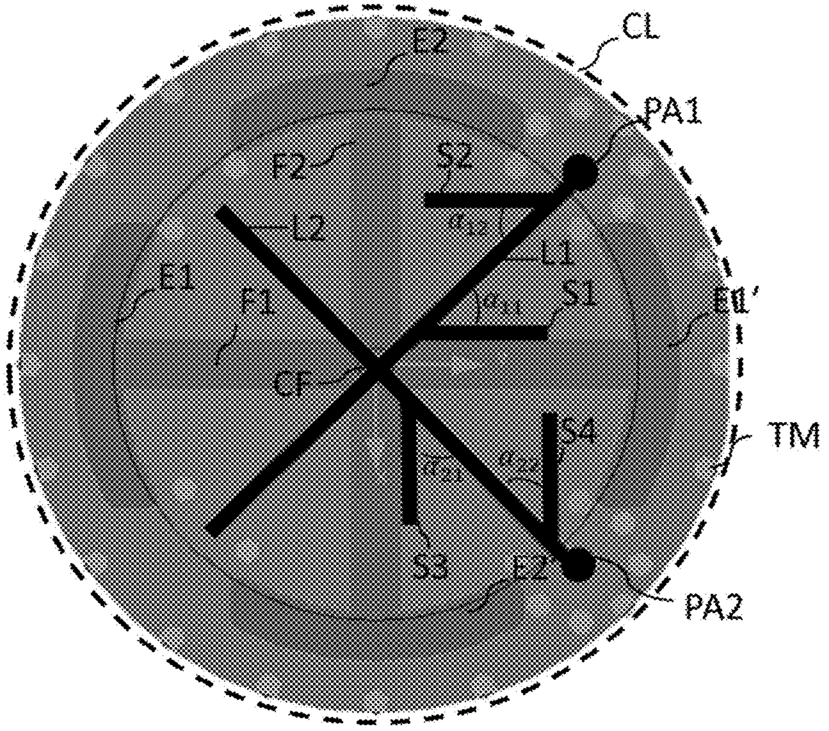

FIG. 4 schematically illustrates a see-through view from above of the stack formed by elements of one advantageous embodiment of the elementary antenna of the invention, a layer comprising the slots F1, F2, the conductive line L1, and the line L2. In this embodiment, the antenna 1 allows the radiation generated by the elementary antenna outside of its bandwidth to be filtered and allows parasitic signals that might otherwise transit during transmission or reception to be eliminated, without decreasing radiation efficiency. To do this, the exciting device DE of the elementary antenna 1 comprises:

first and second stubs S1, S2 that are coplanar and connected to the first conductive line L1 and not perpendicular to the first conductive line L1. An angle $\alpha_{11}$ between the first stub S1 and the first conductive line is opposite to an angle $\alpha_{22}$ between the second stub S2 and the first conductive line. This implies that the stubs S1 and S2 are parallel to each other.

Third and fourth stubs S3, S4 are coplanar and connected to the second conductive line and not perpendicular to the second conductive line L2. An angle $\alpha_{21}$ between the third stub S3 and the second conductive line is opposite to an angle $\alpha_{22}$ between the fourth stub S4 and the second conductive line. This implies that the stubs S1 and S2 are parallel to each other.

According to one embodiment, the stubs are straight. According to one embodiment, the stubs are curved. In this embodiment, by "angle between a stub and a conductive line", what is meant is an angle between a main direction of elongation of the stub and the conductive line.

These stubs S1-S4 are propagation-line stubs that are connected to the propagation line L1 or L2 and that are intended to add a certain pure susceptance to the junction with the main propagation line L1 or L2. A pair of stubs in cascade allows filtering of order 2 to be applied, improving the band of the filter formed by the stubs and the rejection ratio. The shape, positioning and length of these stubs have been optimized by the inventors in order to meet the constraint of integratability into the elementary antenna, which has a disc-shaped transverse footprint. After many calculations, the inventors have succeeded in finding a clever arrangement that allows the impact of the stubs on the operation of the elementary antenna 1 in its bandwidth to be limited, while optimizing filtering of the 2nd harmonic (H2) of the central frequency of the bandwidth of the elementary antenna. The stubs (their shape and length) were optimized "manually" rather than automatically because simulation time is prohibitive when software is used to simulate both the useful frequency band and the H2 band, and because it is difficult to achieve convergence. The impact of the stubs was observed on SWR levels in the bandwidth (SWR being the acronym of standing wave ratio), and H2 filtering was observed via rejection ratio and frequency band. It will be noted that use of stubs inclined with respect to the line to which they are connected is different from the geometry conventionally used in stub-based frequency filtering.

In the case of a single printed line (i.e. without slots F1, F2), the optimal geometry for frequency filtering would correspond to stubs perpendicular to the line. However, the inventors have noted that, in the elementary antenna of the invention, this geometry leads to spatial overlap between one of the slots and one stub, greatly degrading the operation of the slot. Likewise, greater alignment of (i.e. a smaller angle between) the stubs and the conductive line to which they are connected creates substantial parasitic coupling between the line and the stubs. Hence, for optimal operation, it is preferable for the first and second stubs to be parallel to the first slot and for the third and fourth stubs to be parallel to the second slot.

The optimal geometry therefore corresponds to the one illustrated in FIG. 4. In this embodiment, an assembly formed by the first stub S1, the second stub S2 and a portion of the first conductive line connecting the first stub to the second stub, forms the letter Z. Likewise, an assembly formed by the third stub S3, the fourth stub S4 and a portion of the second conductive line connecting the third stub to the fourth stub, forms the letter Z. Preferably, in the embodiment of FIG. 4, in order to optimize frequency filtering without excessively degrading the SWR level of the elementary antenna, the first stub faces an edge of the first slot and the third stub faces an edge of the second slot. According to another embodiment, the position of the stubs S1-S4 is different from that illustrated in FIG. 4, the stubs S1 and S2 being arranged so as to be symmetrical with the stubs S3 and S4, respectively, in rotation about the central axis AC.

To optimize frequency filtering, preferably, the stubs are substantially of the same length. By substantially of the same length, what is meant is that their length is equal to ±10%, and preferably ±5%. Preferably, in order to optimize filtering of the 2nd harmonic, the length of the stubs is substantially equal to $\lambda_c/4$, with $\lambda_c$ the wavelength in the printed dielectric medium in question corresponding to the central frequency of the frequency band to be filtered (here for example the band about the harmonic frequency H2). This length has been optimized to limit parasitic stub/slot interactions and parasitic stub/printed-stripline interactions, the parasitic interactions between the stubs S1-S4 and lines L1, L2 being the most critical in terms of degradation of the SWR because they lead to a capacitive effect that tends to modify the electrical length of the lines.

By virtue of the stubs S1-S4, SWR levels are controlled in the bandwidth of the antenna, in the entire angular range of electronic beam pointing. The filtering function allows a rejection of the order of −20 dB in the band of the harmonic H2, with respect to an elementary antenna without the stubs S1-S4.

Another subject of the invention is an antenna array 2 comprising a plurality of elementary antennas 1 according to the invention. As mentioned above, the array 2 formed from the elementary antenna of the invention allows easy control of the polarization of the radiation emitted by each elementary antenna of the array via control of their orientation, without modification of the lattice of the array and without modification of the total footprint of the array.

Figure 5:
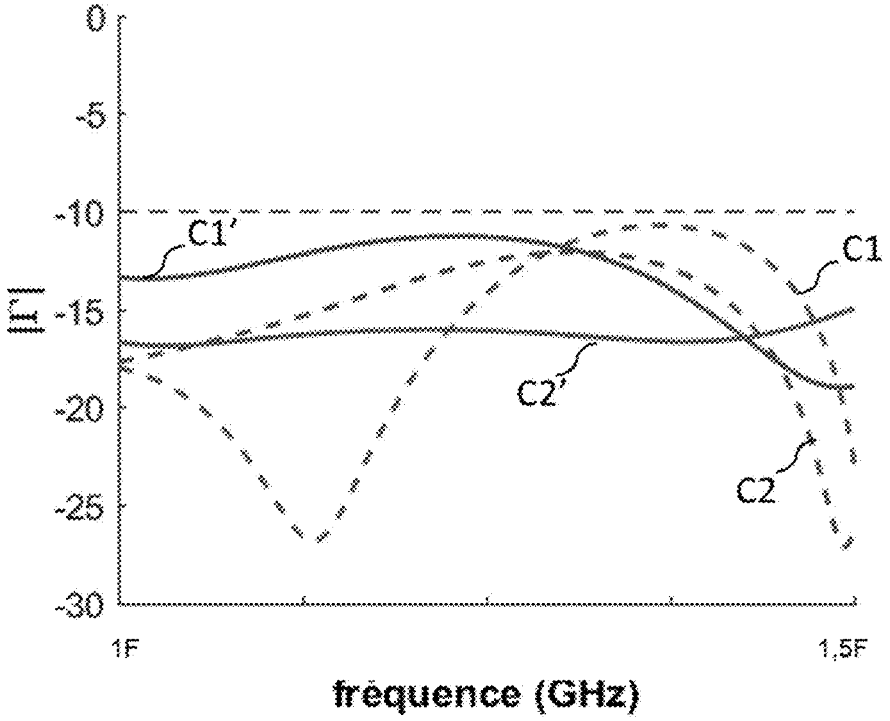

FIG. 5 is a graphical representation of the S11 parameter of two embodiments of the elementary antenna of the invention comprising stubs S1-S4 according to the embodiment of FIG. 4. The x-axis is in GHz, F corresponding to the minimum frequency of the working frequency band of the antenna array, and the y-axis is in dB. It will be recalled that the S11 parameter of an antenna is the reflection coefficient at the input of the elementary antenna (ratio between the reflected wave and the incident wave at the input).

Curves C1 and C2 are the S11 parameter of a first embodiment M1 in which the stack of the elementary antenna comprises an upper dielectric layer that protects the antenna mechanically, for an excitation using the line L1 and L2, respectively. This upper dielectric layer is a layer of Rohacell foam of 6 mm thickness, covered by a PTFE dielectric film filled with ceramic of 500 μm thickness.

Curves C1' and C2' are the S11 parameter of a second embodiment M2 without a protective upper layer, for an excitation using the line L1 and L2, respectively. In the embodiment M2, the value of the reflection coefficient remains lower than −16 dB in the entire bandwidth of the antenna for an excitation via the line L2 and higher than −19 dB for an excitation via the line L2. The presence of the protective upper layer in the embodiment M1 substantially degrades the wideband operation of the elementary antenna. However, the value of the reflection coefficient remains acceptable throughout the bandwidth (higher than −27 dB).

FIG. 5 demonstrates that the elementary antenna of the invention possesses a wideband operation in both the embodiments M1 and M2, although embodiment M2 has a more stable behaviour in the entire bandwidth of the antenna, for excitations using both L1 and L2, the presence of the stubs S1-S4 not degrading the operation of the antenna substantially.

Figure 6:
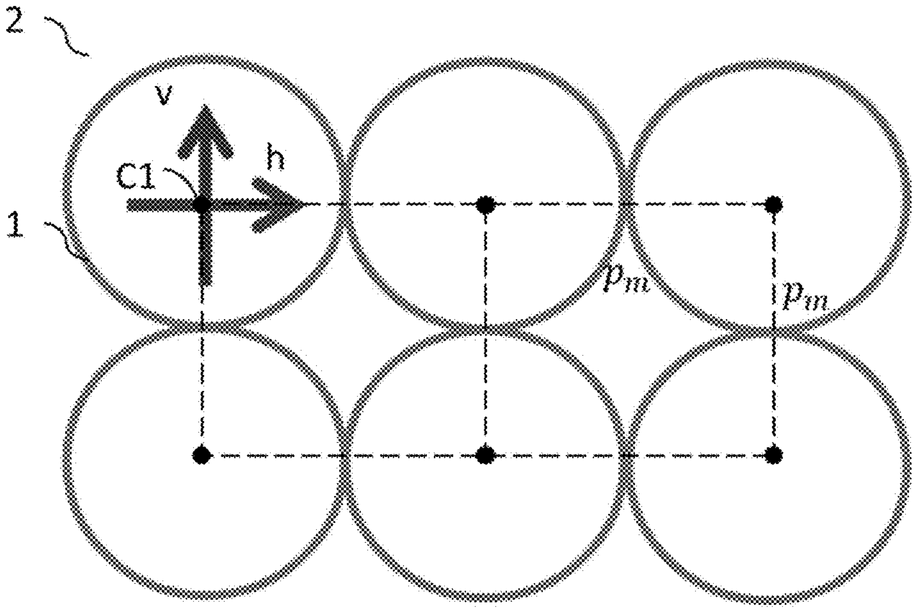

FIG. 6 schematically illustrates an antenna array 2 according to one embodiment of the invention in which the elementary antennas 1 are arranged in a square lattice so as to be able to excite a horizontal polarization and a vertical polarization. By square lattice, what is meant is that a distance between the centre of two adjacent elementary antennas (pitch $p_m$ of the lattice) is identical for all the antennas 1 of the array 2. The lattice of FIG. 6 allows an antenna array 2 with a directivity set by the pitch of the array to be obtained.

Alternatively, according to another embodiment, the elementary antennas 1 of the array 2 are arranged in a rectangular lattice. In other words, the antenna array 2 has a different lattice pitch in the horizontal direction and in the vertical direction. This is useful when the beam radiated by the antenna array needs to be pointed by electronic scanning in a rectangular azimuth-elevation angular window. This is for example the case with synthetic-aperture radar (SAR) or airborne surveillance radar. In this case, the lattice of the array may be relaxed along the axis corresponding to the smaller angle of exploration.

Figure 7:
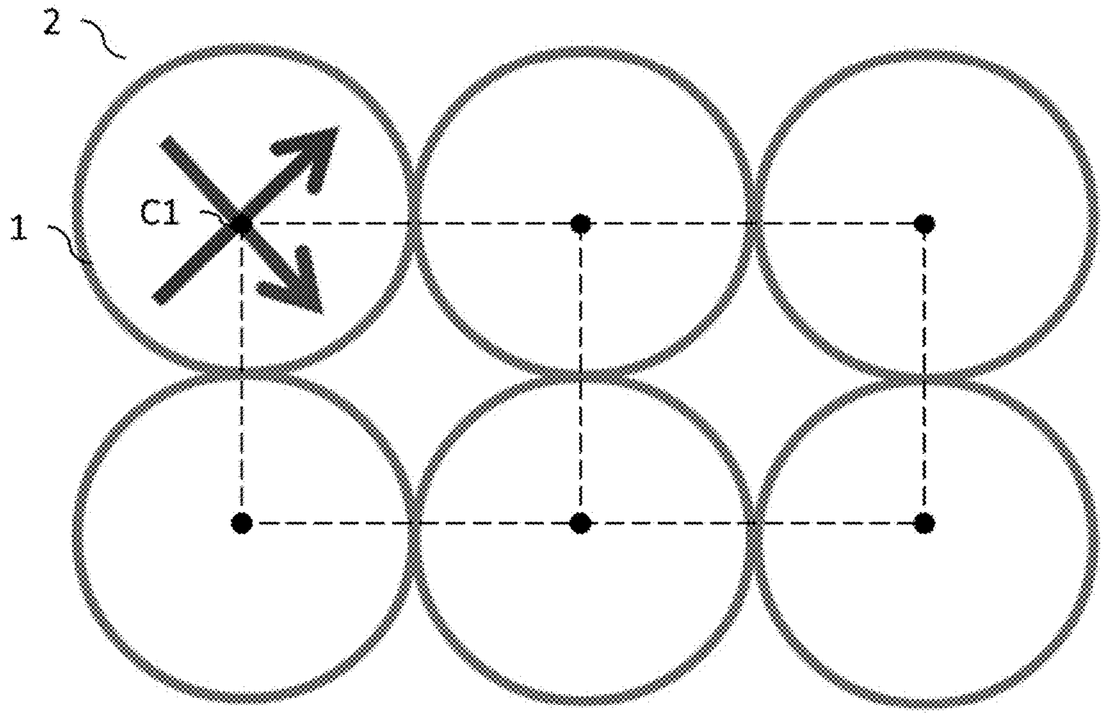

FIG. 7 schematically illustrates an antenna array 2 according to one embodiment of the invention, in which the orientation of the elementary antennas 1 has been modified with respect to the array of FIG. 6. In the embodiment of FIG. 7, the elementary antennas have been oriented so as to be able to excite polarizations at +45° and −45° to the polarizations excited in the array of FIG. 6. As in the array of FIG. 6, the lattice of the array of FIG. 7 is square and the pitch $p_m$ identical to that of the array of FIG. 6. Furthermore, the total footprint of the array 2 of FIG. 7 is identical to that of the array of FIG. 6.

Figure 8:
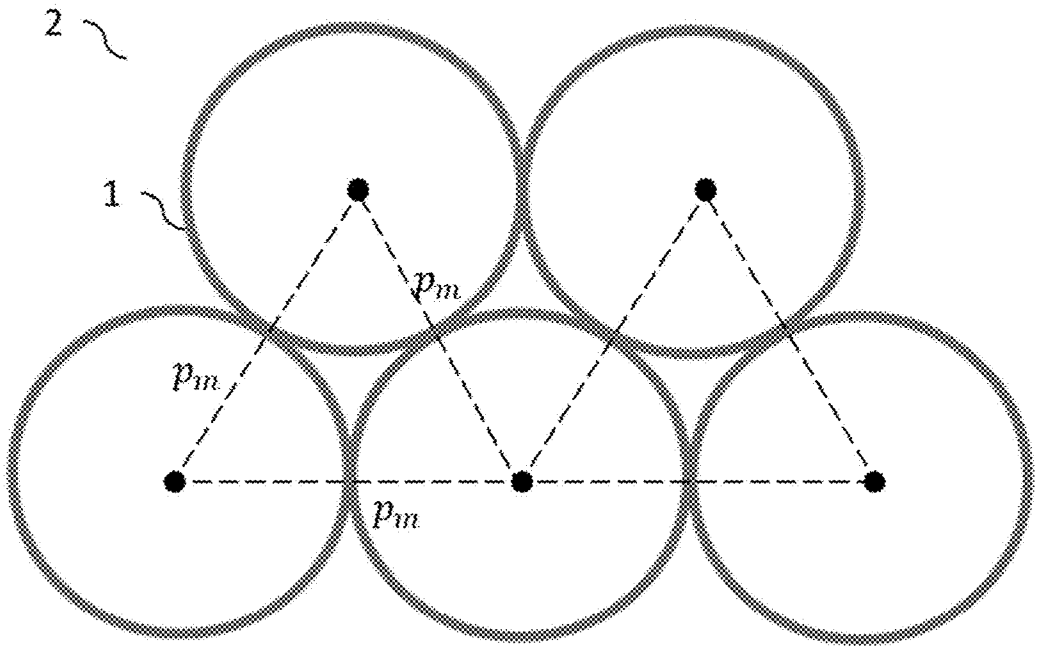

FIG. 8 schematically illustrates an antenna array 2 according to one embodiment of the invention, in which the elementary antennas 1 of the array 2 are arranged in a triangular lattice. In this embodiment, by way of non-limiting example, the lattice is an equilateral-triangle lattice (also called a hexagonal lattice) and the orientation of the polarizations is arbitrary. By hexagonal lattice, what is meant is that the centre of an antenna forms an equilateral triangle of lattice pitch $p_m$ with the centre of two adjacent antennas. This is useful in an antenna array, the beam of which is to be pointed by electronic scanning inside an angular cone centred on the normal to the plane of the array. This is for example the case of a front-mounted aeroplane-borne radar (airborne weather radar, or airborne combat radar). The advantage with respect to a square lattice is that, at equal antenna-array area, about 15% fewer unitary elements are required to "tile" the radiating area, and therefore 15% fewer active circuits (modules), and therefore cost is decreased by 15%, at the price however of a less straightforward mechanical design.

The invention claimed is:

1. An elementary microstrip antenna comprising a stack of layers, stacked in a direction z, said stack comprising:

a first conductive radiating element of disc shape having a first centre and a central axis in the direction z passing through said first centre;

an exciting device coupled to the first conductive radiating element to excite the first conductive radiating element with two orthogonal linear polarizations, said exciting device comprising:

a first elementary exciting device coupled to the first conductive radiating element and comprising a first conductive line and a first power-distributing device to excite the first conductive radiating element based on a first input signal;

a second elementary exciting device coupled to the first conductive radiating element and comprising a second conductive line and a second power-distributing device to excite the first conductive radiating element based on a second input signal;

a coupling assembly to couple the exciting device and the first conductive radiating element, said coupling assembly comprising:

a first slot and a second slot the first slot and the second slot having coincident slot centers, said slot centers being located on said central axis, the second slot being substantially perpendicular to the first slot, the first and second slots each comprising circularly arcuate ends on a same circle centred on said coincident slot centres; said first slot and said second slot and said stack of layers defining a disc-shaped transverse footprint of said elementary microstrip antenna, the layers of the stack being disc-shaped and the polarizations of the exciting device are configured by a rotation of the elementary antenna.

2. The elementary antenna according to claim 1, wherein the exciting device comprises:

first and second stubs that are coplanar and connected to the first conductive line, and not perpendicular to the first conductive line, an angle between the first stub and the first conductive line being opposite to an angle between the second stub and the first conductive line;

third and fourth stubs that are coplanar and connected to the second conductive line, and not perpendicular to the second conductive line, an angle between the third stub and the second conductive line being opposite to an angle between the fourth stub and the second conductive line.

3. The elementary antenna according to claim 2, wherein the first and second stubs are parallel to the first slot and wherein the third and fourth stubs are parallel to the second slot.

4. The elementary antenna according to claim 3, wherein an assembly formed by the first and second stubs and a portion of the first conductive line connecting the first stub to the second stub, forms the letter Z, and wherein an assembly formed by the third and fourth stubs and a portion of the second conductive line connecting the third stub to the fourth stub, forms the letter Z.

5. The elementary antenna according to claim 3, wherein the first stub faces an edge of the first slot and the third stub faces an edge of the second slot.

6. The elementary antenna according to claim 2, wherein said stubs are substantially of the same length.

7. The elementary antenna according to claim 6, wherein the length of the stubs is about equal to $\lambda_c/4$ with $\lambda_c$ a wavelength corresponding to a central frequency of a bandwidth of said elementary antenna.

8. The elementary antenna according to claim 1, wherein a middle of said first line is located on said central axis, wherein a middle of said second line is located on said central axis, and wherein the first and second lines are perpendicular to each other.

9. The elementary antenna according to claim 8, wherein the first line and the second line are formed on two opposite faces of a first dielectric substrate.

10. The elementary antenna according to claim 1, wherein said transverse footprint is set based on a diameter of said circle.

11. The elementary antenna according to claim 1, wherein an angle between the first slot and the first conductive line and an angle between the second slot and the second conductive line is equal to about 45°.

12. The elementary antenna according to claim 1, wherein the first and second conductive lines are interposed between the first radiating element and the first and second slots, the first and second slots being formed from a metal plane, forming a ground plane for the first and second conductive lines and for the first radiating element.

13. The elementary antenna according to claim 1, comprising a second disc-shaped radiating element superposed on the first radiating element, and having a second centre located on said central axis.

14. An antenna array comprising a plurality of elementary antennas according to claim 1, wherein the elementary antennas are tangent in the antenna array.

15. The antenna array according to claim 14, wherein the plurality of elementary antennas is arranged in a square or rectangular lattice.

16. The antenna array according to claim 14, wherein the plurality of elementary antennas is arranged in a triangular lattice.

* * * * *